US008303720B2

(12) United States Patent  (10) Patent No.: US 8,303,720 B2
Pastoor  (45) Date of Patent: Nov. 6, 2012

(54) APPARATUS FOR AND A METHOD FOR CLEANING THE FLOOR OF AN ACCOMMODATION OF AN ANIMAL

(75) Inventor: Jan Lambertus Pastoor, Delft (NL)

(73) Assignee: Maasland N.V., Maassluis (NL)

( * ) Notice: Subject to any disclaimer, the term of this patent is extended or adjusted under 35 U.S.C. 154(b) by 566 days.

(21) Appl. No.: 12/295,878

(22) PCT Filed: Feb. 15, 2007

(86) PCT No.: PCT/NL2007/000043
§ 371 (c)(1),
(2), (4) Date: Oct. 3, 2008

(87) PCT Pub. No.: WO2007/114684
PCT Pub. Date: Oct. 11, 2007

(65) Prior Publication Data
US 2009/0288681 A1  Nov. 26, 2009

Related U.S. Application Data

(63) Continuation of application No. PCT/NL2007/000043, filed on Feb. 15, 2007.

(30) Foreign Application Priority Data

Apr. 4, 2006  (NL) ..................................... 1031506

(51) Int. Cl.
*A01K 1/00*  (2006.01)
(52) U.S. Cl. ................. 134/6; 134/34; 15/319; 119/416
(58) Field of Classification Search ............... 134/6, 32, 134/34; 15/319; 119/416
See application file for complete search history.

(56) References Cited

U.S. PATENT DOCUMENTS 2,966,256 A  12/1960  McLeland
(Continued)

FOREIGN PATENT DOCUMENTS

DE  1109441 A  6/1961
(Continued)

OTHER PUBLICATIONS

Notice of Opposition to a European Patent, EP 2001281. Granted Sep. 23, 2009 in the Name of Maasland N.V.

*Primary Examiner* — Michael Kornakov
*Assistant Examiner* — Douglas Lee
(74) *Attorney, Agent, or Firm* — Coraline J. Haitjema; David P. Owen; Hoyng Monegier LLP

(57) ABSTRACT

An apparatus for cleaning the floor of an accommodation of an animal includes a master unit and a mobile unit that is movable relative to the master unit. A floor-cleaning device and an air-flow-generating device are disposed on the mobile unit that is movable relative to the remaining part of the apparatus. The apparatus further includes a control system for controlling the operation of the apparatus. The control system activates the air-flow-generating device when the mobile unit moves away from the master unit and deactivates the air-flow-generating device when the mobile unit moves towards the master unit. After activation of the air-flow-generating device, the control system activates the floor-cleaning device when the mobile unit moves towards the master unit and deactivates the floor-cleaning device when the mobile unit has reached the master unit.

29 Claims, 4 Drawing Sheets

U.S. PATENT DOCUMENTS

| | | | |
|---|---|---|---|
| 3,241,173 A * | 3/1966 | Finn | 15/328 |
| 3,273,038 A | 9/1966 | Miller | |
| 3,676,891 A * | 7/1972 | Murray et al. | 15/346 |
| 4,119,900 A | 10/1978 | Kremnitz | |
| 5,054,159 A | 10/1991 | Richardson | |
| 5,109,566 A | 5/1992 | Kobayashi | |
| 5,309,592 A | 5/1994 | Hiratsuka | |
| 5,341,540 A | 8/1994 | Soupert | |
| 5,426,805 A * | 6/1995 | Fisher | 15/79.2 |
| 5,646,494 A | 7/1997 | Han | |
| 5,951,782 A * | 9/1999 | Truitt | 134/21 |
| 6,494,514 B1 | 12/2002 | Stinnett et al. | |
| 7,270,078 B2 | 9/2007 | Van Den Berg et al. | |
| 2002/0130207 A1 | 9/2002 | Van Den Berg | |

FOREIGN PATENT DOCUMENTS

| | | |
|---|---|---|
| DE | 1183301 A | 12/1964 |
| DE | 4425924 A | 1/1996 |
| DE | 4444508 C1 | 2/1996 |
| EP | 0142594 B1 | 6/1989 |
| EP | 569984 A1 * | 11/1993 |
| EP | 0382693 B1 | 10/1994 |
| EP | 0943235 A2 | 9/1999 |
| EP | 1369010 A1 | 5/2003 |
| EP | 1369017 A1 | 10/2003 |
| EP | 1397956 A1 | 3/2004 |
| EP | 1523882 A2 | 4/2005 |
| EP | 1584230 A | 10/2005 |
| EP | 1369012 B1 | 4/2008 |
| GB | 2313190 A | 11/1997 |
| GB | 2313191 A | 11/1997 |
| GB | 2313213 A | 11/1997 |
| NL | 7416427 A | 6/1975 |
| WO | 9603259 A1 | 2/1996 |
| WO | 0070935 A | 11/2000 |
| WO | 0070936 A | 11/2000 |
| WO | WO 0070935 A1 * | 11/2000 |

* cited by examiner

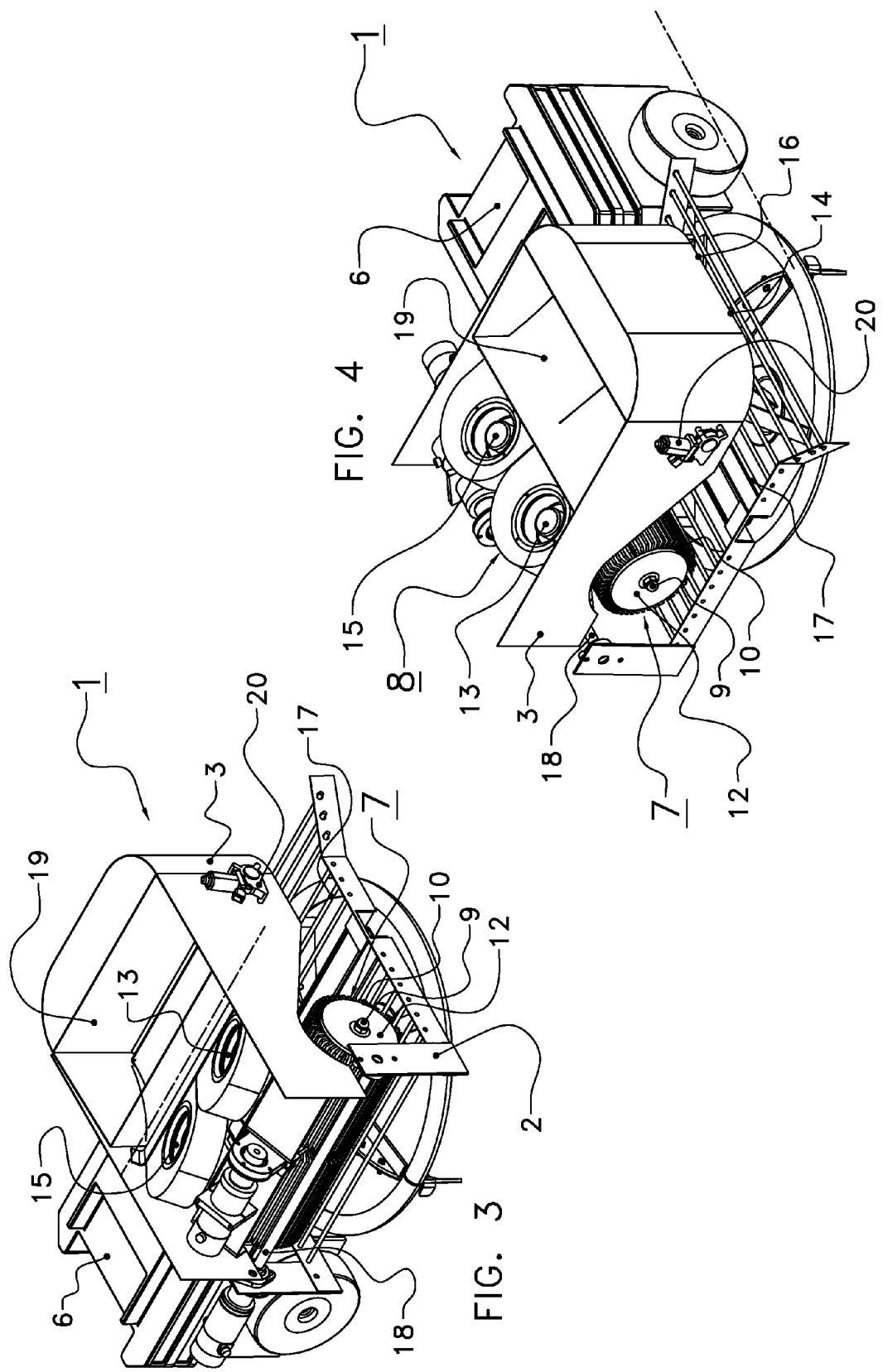

APPARATUS FOR AND A METHOD FOR CLEANING THE FLOOR OF AN ACCOMMODATION OF AN ANIMAL

CROSS REFERENCE TO RELATED APPLICATIONS

This application is a continuation of International Application No. PCT/NL2007/000043 which was published under PCT Article 21(2) in English, the contents of which are hereby incorporated by reference in their entirety.

BACKGROUND OF THE INVENTION

1. Field of the Invention

The invention relates to an apparatus for cleaning the floor of an accommodation of an animal using an air flow generating device and further to a method of performing such cleaning.

2. Description of the Related Art

A cleaning apparatus is known from Dutch patent 1024518 and U.S. Pat. No. 7,270,078 the contents of which are hereby incorporated by reference in their entirety. These documents discloses inter alia an autonomous cleaning robot (shown in FIG. 23 of said patent), the cleaning robot cleaning the floor of a rotating feed platform by first spraying water on the floor, then brushing and subsequently drying the floor by means of (if desired, heated) air.

Although this known apparatus functions properly, in some cases the floor appears to be insufficiently clean after one cleaning and an additional cleaning is often necessary.

BRIEF SUMMARY OF THE INVENTION

The present invention aims to provide an apparatus for cleaning the floor of an accommodation of an animal, in which apparatus the above-mentioned drawback is at least partially overcome.

According to the invention, there is provided an apparatus for cleaning an animal accommodation or stall provided with an air-flow-generating device, and with a control system for controlling the operation of the apparatus, the apparatus being movable over the floor controlled by the control system and the apparatus performing a cleaning of the floor controlled by the control system, wherein the control system is programmed to control the cleaning of the floor in such a way that the control system first activates and subsequently deactivates the air-flow-generating device. The invention is based on the insight that in the case of the known apparatus, cleaning is first performed by means of water. As a consequence, dry material lying on the floor gets wet and may stick to or cake onto the floor, so that removal of this caking material from the floor is difficult. By programming, according to the invention, the control system in such a way that the control system controls the cleaning of the floor in such a way that the control system first activates the air-flow-generating device, dry material, such as sawdust, will be blown from the floor or will be blown anyway from that part of the floor where the cleaning (with water) is subsequently performed. In this manner dry material is prevented from caking on the floor and an improved cleaning of the floor is made possible.

The apparatus is preferably further provided with a floor-cleaning device, the control system being programmed in such a way that the control system activates the floor-cleaning device after having activated the air-flow-generating device. In this case, by the term "after" is meant that the air flow must have been allowed enough time to remove the dry material before the cleaning by means of the floor-cleaning device is performed. It is in particular advantageous if the control system is programmed in such a way that the control system activates the floor-cleaning device during or after deactivation of the air-flow-generating device.

The air-flow-generating device preferably comprises a blow nozzle with an outlet aperture, and comprises in particular a device for adjusting the direction of the outlet aperture. Blowing away the material lying on the floor does not only depend on the force of the air flow, but appears to depend to a great extent on the direction of the air flow. An optimal direction can be determined beforehand by means of simple experiments.

It is in particular advantageous if the air-flow-generating device comprises at least one ventilator, in particular an adjustable ventilator.

In an embodiment of an apparatus according to the invention, the floor-cleaning device comprises a brush that is rotatable about a horizontal axis, the apparatus being preferably provided with means for regulating the brushing pressure on the floor in order to be able to regulate the degree of cleaning the floor. The means for regulating the brushing pressure may comprise wheel-like support elements that may also have a support function or a propelling function. The wheel-like support elements are in particular disposed at the ends of the brush. The drive of the rotatable brush is disposed in an advantageous manner approximately in the middle of the brush.

An apparatus applying a layer of material, such as sawdust or straw, on the floor of an accommodation of an animal after cleaning of the floor, is known per se and, for this purpose, the apparatus comprises a reservoir for storing the material, such as, for example, sawdust or straw. Owing to the strong occurrence of arching of such material, it often appears impossible to apply such a layer of material in a way resulting in a layer having an at least almost desired thickness. Also the known use of an air flow does not always lead to the formation of a layer having at least almost the desired thickness. According to the invention, this problem is at any rate at least partially solved in that the reservoir comprises a wall portion and a bottom portion, an aperture being provided between the wall portion and the bottom portion, a metering device for metering the material being disposed in the aperture, which metering device is drivable by a drive means. The drivable metering device also constitutes a device for preventing arching of the material present in the reservoir, so that it is possible to apply a layer with a desired thickness on the floor. In order further to prevent arching, the apparatus is provided with a device for moving the bottom portion and the wall portion in a reciprocating manner relative to each other. There is obtained a compact apparatus if the device for moving the bottom portion and the wall portion in a reciprocating manner relative to each other is constituted by the drive means for driving the metering device. The control system may be programmed for regulating the amount of material to be supplied by the metering device. This makes it possible to adapt the layer thickness depending on the animal/animals that will be lying on the floor of the accommodation, or to apply a predetermined variation of the layer thickness distributed over the floor.

It is in particular advantageous if the apparatus comprises a master unit and a mobile unit that is movable relative to the master unit, the floor-cleaning device and the air-flow-generating device being disposed on the mobile unit that is movable relative to the remaining part of the apparatus. This makes it possible to distribute the control navigation of the entire apparatus over the master unit, that moves along the accommodations, and the mobile unit, that navigates over the floor of the accommodations, so that the movement of the total apparatus can be controlled very accurately.

The reservoir is preferably disposed on the mobile unit, so that, for example, the use of a transport means for transporting the material from the reservoir located elsewhere to the mobile unit is not necessary.

It is in particular advantageous if the control system is programmed in such a way that the control system activates the air-flow-generating device when the mobile unit moves away from the master unit and deactivates the air-flow-generating device when the mobile unit moves towards the master unit, and, after activation, preferably after deactivation, of the air-flow-generating device, activates the floor-cleaning device when the mobile unit moves towards the master unit and deactivates the floor-cleaning device when the mobile unit has reached the master unit. It is thus ensured that, when the mobile unit moves away from the master unit, the dry material, such as sawdust or straw, is blown in front of the mobile unit, and that, when the mobile unit moves towards the master unit, both the cleaning of the floor and the application of a layer of the material, such as sawdust or straw, is performed. Here, it is preferred that the control system is programmed in such a way that the control system activates the device for moving the bottom portion in a reciprocating manner relative to the wall portion when the mobile unit moves towards the master unit and deactivates the device for moving the bottom portion in a reciprocating manner relative to the wall portion when the mobile unit has reached the master unit.

The mobile unit is mechanically connected with the master unit with the aid of a connecting device. It is thus prevented that the master unit and the mobile unit will be separated from each other. The connecting device preferably comprises a cable that is capable of being unwound from a reel and being wound onto the reel. The reel is preferably drivable by a drive, and, if desired, the drive is capable of being put out of operation by the control system, and the reel is freely rotatable when the drive is out of operation. The control system is preferably programmed in such a way that the drive is put out of operation when the mobile unit moves away from the master unit. If the control system is further programmed in such a way that activation of the floor-cleaning device causes the brush with the wheel-like elements to rotate in such a direction that the mobile unit moves away from the master unit, and, when the mobile unit is moved towards the master unit owing to the fact that the control system puts the drive into operation, then, the cable is unwound from the reel when the reel is freely rotatable and the mobile unit is moved away from the master unit. The movement of the mobile unit is then effected by the rotation of the brush which does not perform a cleaning operation in this situation, because it rolls over the floor via the wheel-like elements. When the mobile unit has to be moved back to the master unit, the reel can be driven in order to pull the mobile unit back to the master unit. By ensuring that the pulling force of the cable is greater than the propelling movement caused by the rotation of the brush of the mobile unit, the brush does effect a cleaning of the floor in this direction of movement.

If the master unit is provided with navigation means and drive means that are controllable by a correctly programmed control system in such a way that the master unit is movable along a row of cubicles at the entrance side thereof, the correctly programmed control system controlling the operation of the mobile unit in such a way that the mobile unit moves away from the master unit into the cubicle for cleaning the floor of the cubicle and that the mobile unit is subsequently moved again towards the master unit, the apparatus is extremely suitable for cleaning cubicles situated side by side.

Since cubicles are generally located at a higher level than the walking alley for the animals next to it, it is possible for the mobile unit to be moved away from the master unit and towards the master unit in a simple manner if the master unit comprises a platform for supporting the mobile unit, the mobile unit being movable from and onto the platform. The platform is preferably disposed at the level of the cubicles if the master unit is located on the walking alley.

If the platform comprises a grid structure, it is possible to clean the brush by driving the brush when the mobile unit is located on the platform.

The invention also relates to a method of cleaning the floor of an accommodation or stall for an animal, wherein the method comprises, as a first cleaning step, first generating an air flow and directing the air flow to the floor for removing loose material lying thereon.

In a preferred embodiment in which an apparatus with a master unit and a mobile unit is used, the method successively comprises the steps of moving the master unit along an accommodation, activating the floor-cleaning device for moving the mobile unit away from the master unit into the accommodation, activating the air-flow-generating device during moving the master unit away from the mobile unit so that an air flow is generated, deactivating the air-flow-generating device, moving the mobile unit towards the master unit, activating the floor-cleaning device, and deactivating the floor-cleaning device when the mobile unit has reached its position of rest on the master unit.

The invention also relates to an apparatus for cleaning the floor of an accommodation of an animal, which apparatus is provided with an air-flow-generating device, and with a control system for controlling the operation of the apparatus, the apparatus being movable over the floor controlled by the control system and the apparatus performing a cleaning of the floor controlled by the control system, wherein the apparatus comprises a master unit and a mobile unit that is movable relative to the master unit, the floor-cleaning device and the air-flow-generating device being disposed on the mobile unit that is movable relative to the remaining part of the apparatus.

In a preferred embodiment of an apparatus according to the invention, the control system is programmed in such a way that it controls the air-flow-generating device in such a way that the air flow has such a force that the loose material will be displaced gradually. In this case, by a gradual displacement is meant that the material to be displaced is not dispersed, but that the material is displaced "carefully".

BRIEF DESCRIPTION OF THE DRAWINGS

The invention will now be explained in further detail with reference to the accompanying figures, in which:

FIGS. 3 and 4 are schematic perspective views of the apparatus of FIG. 1, and

DESCRIPTION OF ILLUSTRATIVE EMBODIMENTS

Figure 1:
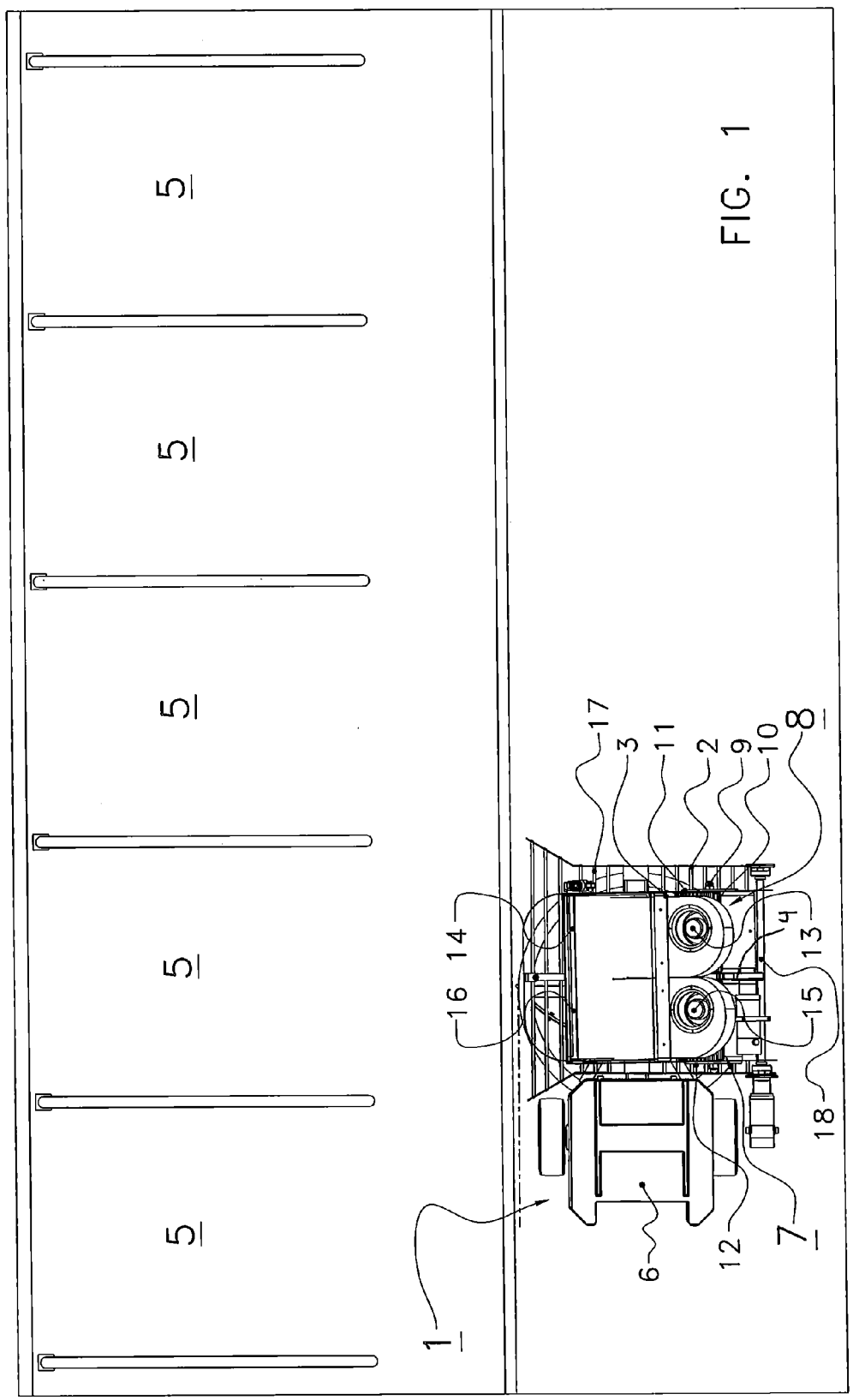
FIG. 1 is a schematic plan view of an unmanned apparatus with a master unit and a mobile unit disposed thereon according to the invention for cleaning the floors of cubicles situated side by side.

FIG. 1 is a schematic plan view of an unmanned apparatus 1 with a master unit 2 and a mobile unit 3, that are interconnected by means of a cord 4, for cleaning the floors of cubicles 5 that are situated side by side. Although the invention is described by way of example with reference to an apparatus with a master unit 2 and a mobile unit 3 that is movable relative to the master unit 2, it will be obvious that the apparatus can also comprise one integrated unit. Furthermore, it will be obvious that it will be possible for the mobile unit 3 to be mechanically connected with the master unit 2 by means of any other suitable device than a cable or cord 4 that is capable of being unwound from a reel 18 and being wound onto said reel. There is also provided a connection between the master unit and the mobile unit for transferring electric power supply and/or control signals.

The master unit 2 is an autonomous vehicle that comprises a control unit known per se (schematically indicated by the block 6 in which also other elements may be included that are necessary for propelling and controlling the master unit 2), which control unit propels the master unit 2 along the cubicles 5 with the aid of position information obtained by sensors or the like. As sensors may be used, for example, ultrasonic sensors, metal detectors, cameras, and the like. Autonomously displaceable vehicles for performing many different functions, as well as the control of such vehicles, are known per se and will consequently not be described here in detail. Automatic loading of the energy supply of the vehicle and automatic loading and unloading of other materials into and from, respectively, containers present on the vehicle, is known as well. It is sufficient to refer to the following patent documents: U.S. Pat. No. 2,966,256, DE-1109441, DE-1183301, EP-0382693, DE-4425924, U.S. Pat. No. 5,309,592, EP-0142594, DE-4444508, GB-2313190, U.S. Pat. No. 5,109,566, GB-2313191, U.S. Pat. No. 3,273,038, NL-7416427, U.S. Pat. No. 5,341,540, U.S. Pat. No. 5,646,494, EP-0943235, EP-1369010, EP-1369012 and EP-1369017.

The mobile unit 3 comprises a floor-cleaning device 7 and an air-flow-generating device 8. The floor-cleaning device 7 comprises a brush 10 that is rotatable about a horizontal axis 9. The brush 10 is provided at its ends with wheel-like elements 11, 12 for propelling the mobile unit 3 over the floor. The brush elements preferably extend over a radial distance that is somewhat greater than the radial size of the wheel-like elements 11, 12. It will be obvious that also other means than brushes, such as a slide or (high pressure) spraying elements, can be used for cleaning the floor. Between the brush 10 and the master unit 2, there is provided a protective element, for example a rubber flap, on the mobile unit 3, in order to prevent that dirt or other material will be distributed unintentionally from the brush to other parts of the apparatus or its environment.

In the embodiment shown, the air-flow-generating device 8 comprises two ventilators 13, 15, each having a blow nozzle 14, 16. The blow nozzles 14, 16 are orientated away from the brush 10. It will be obvious that any other number of ventilators and blow nozzles will be applicable in the apparatus according to the invention. Instead of a ventilator, it is also possible to use a storage vessel with an amount of air stored under high pressure. The direction of the blow nozzle, in particular its outlet aperture, is adjustable in order to obtain an optimal removal of material lying on the floor. In particular, the blow nozzle is orientated in such a way that the air flow has a direction that is realised substantially in the direction of movement of the mobile unit away from the master unit. In this case, a component transverse thereto is possible.

For the purpose of cleaning the floor of a cubicle 5, the control system 6 controls the master unit 2 and the mobile unit 3 in such a way that the mobile unit 3 moves over the floor of the cubicle 5, and the control system 6 also controls the operation of the other means (for example, the brush 10 and the ventilators 13, 15) in such a way that the floor will be cleaned.

According to the invention, the control system 6 is programmed in such a way that the control system 6 controls the cleaning of the floor in such a way that the control system 6 first activates the ventilators 13, 15 (in general the air-flow-generating device), so that loose, dry material will be blown from the floor. After the loose, dry material has at least partially been blown from the floor of the cubicle, the ventilators 13, 15 are deactivated. For the purpose of correctly removing the material, it is possible to regulate the ventilators, if desired, i.e. it is possible to regulate the amount of generated air flow. Hereafter, the brush 10 can be activated or operated in such a way that the floor of the cubicle 5 will be cleaned. It is exactly one of the objects of the invention that the loose material, which is often the least contaminated material, is separated from the other material present on the floor. If the air flow would be much too strong, the loose material lying on the floor would be displaced, it is true, but there would also be the risk of displacing also much more contaminated (and often heavier) material. By ensuring, according to a preferred embodiment of the invention, that, by correctly programming the control system, the air-flow-generating device is controlled in such a way that the air flow has such a force that the loose material will be displaced gradually, it is achieved that only the loose material will be displaced "carefully", without being dispersed. This displaced material can be reused, if desired. In order to achieve this, it is possible to determine by means of simple experiments, prior to the construction of the apparatus, what should be the force of, for example, the air flow generated by a ventilator, for the purpose of achieving such a gradual displacement. In this case, the angle (of inclination) at which the blow nozzle is placed relative to the floor can also be taken into consideration. Within the scope of the invention, displacing this loose material is considered to constitute part of the floor cleaning.

By blowing away and cleaning, loose, dry material, such as straw and/or sawdust, has been removed from the floor and, if the apparatus comprises a reservoir 19 (FIGS. 3 and 4) (for storing material, such as, for example, sawdust or straw), it is possible to deposit a new layer of material on the floor. Said reservoir 19 is preferably disposed on the mobile unit 3, although a reservoir may also be disposed on the master unit 2, a suitable transport means being provided from the master unit 2 to the mobile unit 3 for applying a layer of material on the floor of the cubicle 5 during the movement of the mobile unit 3 over the floor of the cubicle 5. Since dry material, in particular sawdust, has a tendency to arching, according to the invention, the reservoir is provided with means 20 to prevent said arching, so that the application of a layer of material with a uniform thickness is promoted. For this purpose, the reservoir 19 comprises in particular a wall portion and a bottom portion that is movable relative to the wall portion, the apparatus being provided with a device 20 for moving the bottom portion in a reciprocating manner relative to the wall portion. In this case, the device 20 is preferably constituted by a drivable metering device for supplying the material in metered portions, controlled, if desired, by the control system located in the aperture between the bottom wall and the wall portions of the reservoir. It will be obvious that, alternatively, (at least a part of) the wall portion can be moved in a reciprocating manner relative to the bottom portion. By the control by means of the control system it may be ensured, if desired, that there is applied locally a thicker layer of material on the floor, or that the layer thickness depends on the animals for which the accommodation is intended.

Figure 2:
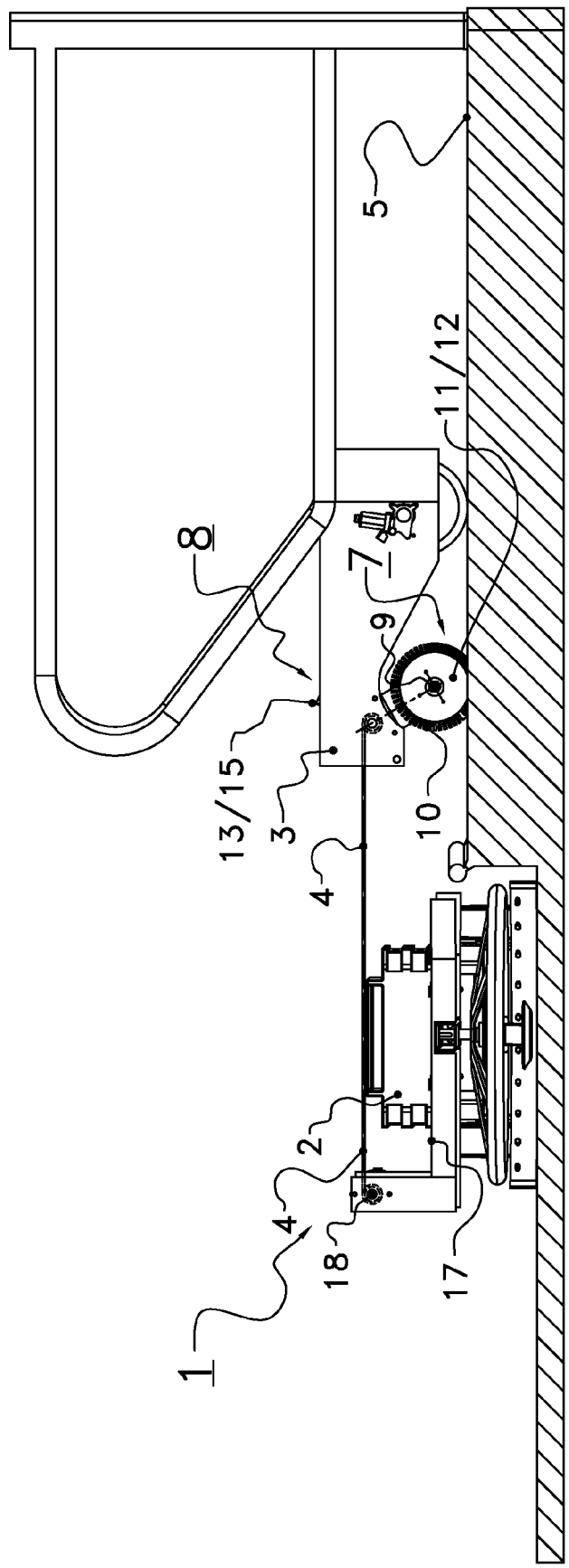
FIG. 2 is a schematic side view of the apparatus shown in FIG. 1 according to the invention, the mobile unit being located at some distance from the master unit.
Figure 5:
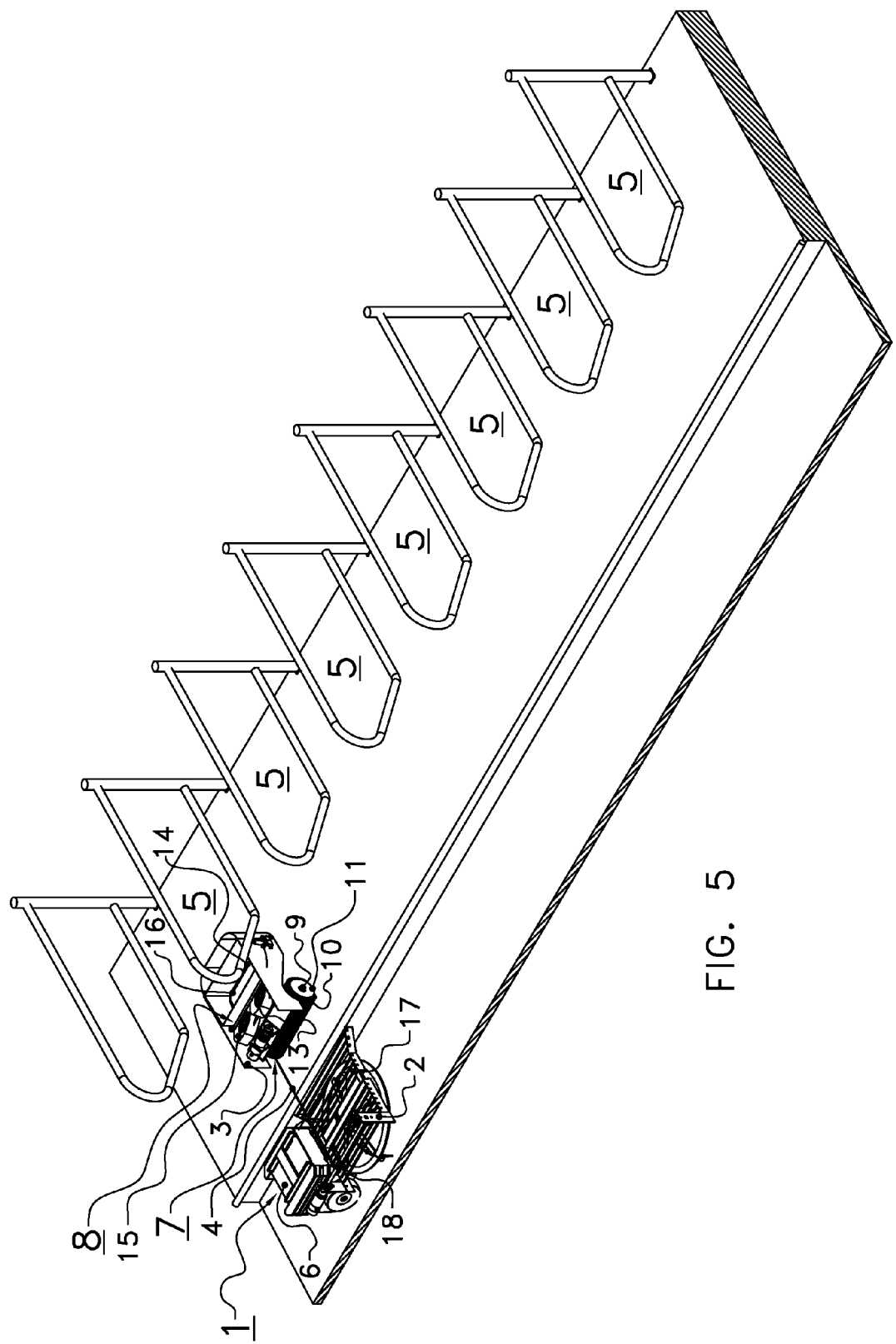
FIG. 5 is a schematic perspective view of FIG. 2.

As mentioned above, the master unit 2 comprises navigation means and drive means that are controllable by the correctly programmed control system 6 in such a way that the master unit 2 is movable along a row of cubicles 5 at the side of the entrance thereof. The master unit 2 preferably comprises a platform 17 for supporting the mobile unit 3, the mobile unit 3 being movable from and onto the platform 17. The platform 17 has preferably a grid structure, so that dirt and the like falling from the brush 10 will fall down through the grid structure. Since cubicles are located in general at a somewhat higher level than the path leading to the entrance of the cubicle, as schematically shown in FIG. 2, the platform 17 is preferably situated in such a way that there is at least almost no difference in height with the floor of the cubicle, so that it is possible for the mobile unit 3 to move in a simple manner from and onto the platform 17.

The correctly programmed control system 6 controls the operation of the apparatus in such a way that the master unit 2 stops when it has reached an entrance of a cubicle 5, after which the control system 6 controls the mobile unit 3 in such a way (by driving the brush 10 and consequently the wheel-like elements 11, 12) that the mobile unit 3 moves away from the master unit 2 into the cubicle 5 for cleaning the floor of the cubicle 5. In this case, the reel 18, about which the cable 4 has been wound, has been switched off, so that the reel 18 is freely rotatable. Consequently, the brush 10 is unwound over the floor of the cubicle 5 and does not exert a brushing effect, but substantially only effects the drive of the mobile unit 3; in this case, the cleaning effect produced by the brush is small. Alternatively, the reel can be driven synchronously with the brush in such a way that the tension of the cable 4 will remain almost the same during the movement of the mobile unit. The ventilators 13, 15 are activated and consequently there is generated via the blow nozzles 14, 16 an air flow over the floor of the cubicle blowing loose material substantially in front of the mobile unit 3 (a relatively small transverse component is possible), into the side of the floor of the cubicle 5 that is faced away from the entrance to the cubicle 5. In this case, the direction (in particular the inclination) of the blow nozzle and the speed of the ventilator is adjusted, if desired, in such a way that an optimal removal of the material is achieved. When the mobile unit 3 has reached the end of the cubicle 5, which can be achieved, for example, by suitable sensors on the mobile unit 3 or by a predetermined length of the cable 4 and a torsion sensor in the reel 18, the ventilators 13, 15 are deactivated (if desired, gradually or according to a particular controlled progress). When the cubicle is occupied by an animal, the dry material blown to the end of the cubicle 5 is again dispersed over the floor of the cubicle by the natural movements of this animal.

After (or possibly almost simultaneously with) deactivation of the ventilators 13, 15, the mobile unit 3 is moved towards the master unit 2 by activation of the drive of the reel 18, so that the cable 4 is wound onto the reel 18. In this case, it is ensured that the adjustment is such that the force with which the reel drive pulls the mobile unit 3 to the master unit 2 is greater than the force with which the rotating brush 10 tends to move the mobile unit 3 away from the master unit 2. Consequently, now, i.e. when the mobile unit 3 moves to the master unit 2, the rotating brush 10 does effect a cleaning of the floor of the cubicle 5. Although the brush 10 is thus driven during the complete movement away from the master unit 2 and towards the master unit 2, the brush 10 does not perform a cleaning function when being moved away from the master unit 2, but only serves for the purpose of propelling.

When the mobile unit 3 has arrived eventually again on the platform 17, the relevant drives can be put out of operation. If desired, the drive of the brush 10 may remain activated for some time, or be activated for a while after a particular period of time after switching off has elapsed, so that the brush 10 is rotated in contact with the grid-shaped platform 17, so that dirt present on the brush 10 will be removed at least partially. If desired, almost immediately before reaching the platform, the direction of rotation of the brush can be reversed, so that the mobile unit will move in a simpler manner from the floor onto the platform.

In the case that the mobile unit 3 is provided with a reservoir 19, for example for sawdust, the control system 6 is programmed in such a way that the control system 6 activates the metering device and the device 20 for moving the bottom portion in a reciprocating manner relative to the wall portion when the mobile unit 3 moves towards the master unit 2, and deactivates the metering device and the device 20 for moving the bottom portion in a reciprocating manner relative to the wall portion when the mobile unit 3 has reached the master unit 2. It will be obvious that the aperture through which the material falls on the bottom is provided at the side of the brush 10 that is faced away from the master unit 2. Filling the container may take place in numerous ways known per se (also automatically).

Depending on the size of the mobile unit 3 (preferably having a width of approximately 60 cm) and the width of the cubicle 5, the mobile unit 3 is capable of moving more than once in a reciprocating manner over the floor of the cubicle. Furthermore, the invention enables to adapt the dimensions of the cubicles 5 in such a way that there is provided an optimal lying comfort for the animals, since the mobile unit 3 makes it possible to clean almost all shapes and sizes of cubicle floors.

Furthermore, the control system 6 may be provided with a cleaning scheme for performing the cleaning at regular intervals, for example every two hours. The apparatus is further provided with a sensor, for example a camera with image recognition equipment, a detector for detecting a transponder worn by an animal, and the like, in order to detect whether an animal is present in a cubicle. When an animal is present in the cubicle, the mobile unit 3 is not activated, of course, and the master unit 2 moves to the next unoccupied cubicle. A cubicle may further be provided with means, for example an animal recognition system known per se, that detect when an animal has been lying in the cubicle. For example, when no animal has entered the cubicle since the latest cleaning of the floor of the cubicle, this cubicle will be excluded at a cleaning planned according to the cleaning scheme. For this purpose, the control unit 6 of the apparatus (master unit 2 and mobile unit 3) is provided with or connected with a device that is in communication with a device for detecting (present or past) occupation of a cubicle.

According to the invention, there is thus provided a method of cleaning the floor of an accommodation for an animal, the method comprising, as a first cleaning step, first generating an air flow and directing the air flow to the floor for removing loose material lying thereon. Hereafter, the method performs a step of removing material remaining on the floor, which step may comprise, for example, rotating a brush or activating a slide or sprayers. After said second cleaning step, the method may comprise a step of applying a new layer of dry material. In the case that a number of cubicle floors situated side by side are to be cleaned, the method also comprises the step of moving the apparatus (with a master unit and a mobile unit) along the accommodation. After detection of the entrance of the accommodation, the master unit is stopped and the mobile unit is activated so that it will move over the floor of the accommodation in a direction away from the master unit. In this case, the air-flow-generating device is activated, so that an air flow is generated. Then, the air-flow-generating device is deactivated, and the mobile unit is moved towards the master unit, and the floor-cleaning device is activated. When the mobile unit has reached its position of rest on the master unit, the floor-cleaning device is deactivated.

The invention is not limited to the embodiments described. The person skilled in the art will be able to apply various modifications and adaptations without departing from the spirit and scope of the invention, the scope of protection for the invention being determined by the accompanying claims.

What is claimed is:

1. An unmanned apparatus for cleaning the floor of an animal accommodation, the apparatus being provided with an air-flow-generating device, which generates air-flow by blowing air, and a floor-cleaning device, and with a control system for controlling the operation of the apparatus, the apparatus being movable over the floor controlled by the control system and the apparatus performing a cleaning of the floor controlled by the control system; wherein the apparatus comprises a master unit and a mobile unit that is movable relative to the master unit, the floor-cleaning device and the air-flow-generating device being disposed on the mobile unit that is movable relative to the remaining part of the apparatus; and wherein the control system is programmed in such a way that the control system activates the air-flow-generating device when the mobile unit moves away from the master unit and deactivates the air-flow-generating device when the mobile unit moves towards the master unit, and, after activation of the air-flow-generating device, activates the floor-cleaning device when the mobile unit moves towards the master unit and deactivates the floor-cleaning device when the mobile unit has reached the master unit.

2. An apparatus as claimed in claim 1, wherein the air-flow-generating device comprises a blow nozzle with an outlet aperture.

3. An apparatus as claimed in claim 2, wherein the air-flow-generating device comprises a device for adjusting the direction of the outlet aperture.

4. An apparatus as claimed in claim 1, wherein the air-flow-generating device comprises at least one ventilator.

5. An apparatus as claimed in claim 4, wherein the ventilator is an adjustable ventilator.

6. An apparatus as claimed in claim 1, wherein the floor-cleaning device comprises a brush that is rotatable about a horizontal axis.

7. An apparatus as claimed in claim 6, wherein the apparatus is provided with an arrangement for regulating the brushing pressure on the floor.

8. An apparatus as claimed in claim 6, wherein the brush is provided with wheel-like support elements.

9. An apparatus as claimed in claim 8, wherein the wheel-like support elements are disposed at the ends of the brush.

10. An apparatus as claimed in claim 6, wherein the drive of the rotatable brush is disposed approximately in the middle of the brush.

11. An apparatus as claimed in claim 1, the apparatus comprising a reservoir for storing particulate material, wherein the reservoir comprises a wall portion and a bottom portion, an aperture being provided between the wall portion and the bottom portion, a metering device for metering the material being disposed in the aperture, which metering device is drivable by a drive means.

12. An apparatus as claimed in claim 11, wherein the apparatus is provided with a device for moving the bottom portion and the wall portion in a reciprocating manner relative to each other.

13. An apparatus as claimed in claim 12, wherein the device for moving the bottom portion and the wall portion in a reciprocating manner relative to each other is constituted by the drive means for driving the metering device.

14. An apparatus as claimed in claim 11, wherein the control system is programmed for regulating the amount of material to be supplied by the metering device.

15. An apparatus as claimed in claim 11, wherein the apparatus comprises a master unit and a mobile unit that is movable relative to the master unit, the floor-cleaning device and the air-flow-generating device being disposed on the mobile unit that is movable relative to the remaining part of the apparatus and wherein the reservoir is disposed on the mobile unit.

16. An apparatus as claimed in claim 1, wherein the control system is programmed in such a way that the control system activates a metering device when the mobile unit moves towards the master unit and deactivates the metering device when the mobile unit has reached the master unit.

17. An apparatus as claimed in claim 1, wherein the mobile unit is mechanically connected with the master unit with the aid of a connecting device.

18. An apparatus as claimed in claim 17, wherein the connecting device comprises a cable that is capable of being unwound from a reel and being wound onto the reel.

19. An apparatus as claimed in claim 18, wherein the reel is arranged to be drivable by a drive.

20. An apparatus as claimed in claim 19, wherein the drive can be put out of operation by the control system, and in that, when the drive is out of operation, the reel is freely rotatable.

21. An apparatus as claimed in claim 20, wherein the control system is programmed in such a way that the drive is put out of operation when the mobile unit moves away from the master unit.

22. An apparatus as claimed in claim 19, wherein the mobile unit is moved towards the master unit by the control system putting the drive into operation.

23. An apparatus as claimed in claim 1, wherein the master unit is provided with a navigation unit and drive unit that are controllable by a drive control system in such a way that the master unit is movable along a row of cubicles at the entrance side thereof, the drive control system controlling the operation of the mobile unit in such a way that the mobile unit moves away from the master unit into the cubicle for cleaning the floor of the cubicle and that the mobile unit is subsequently moved again towards the master unit.

24. An apparatus as claimed in claim 1, wherein the master unit comprises a platform for supporting the mobile unit, the mobile unit being movable from and onto the platform.

25. An apparatus as claimed in claim 24, wherein the platform comprises a grid structure.

26. A method of cleaning the floor of an animal accommodation wherein the method comprises, using an unmanned apparatus comprising a master unit and a mobile unit that is movable relative to the master unit, a floor-cleaning device and an air-flow-generating device being disposed on the mobile unit that is movable relative to the remaining part of the apparatus;

and which method comprises successively the operations of moving the master unit along an accommodation, activating the floor-cleaning device for moving the mobile unit away from the master unit into the accommodation, activating the air-flow-generating device during moving the master unit away from the mobile unit so that an air flow by blowing air is generated and the air flow is directed to the floor for removing loose material lying thereon; deactivating the air-flow-generating device, moving the mobile unit towards the master unit, activating the floor-cleaning device, wherein the floor-cleaning device removes remaining material on the floor, and deactivating the floor-cleaning device when the mobile unit has reached its position of rest on the master unit.

27. A method as claimed in claim 26, wherein activating the floor cleaning device further comprises rotating a brush that is in contact with the floor.

28. A method as claimed in claim 27, wherein activating the floor cleaning device further comprises putting a layer of material on the floor.

29. A method as claimed in claim 26, wherein the air flow is set to have a force such that the loose material will be displaced gradually.

* * * * *